United States Patent [19]

Utagawa

[11] Patent Number: 5,155,518
[45] Date of Patent: Oct. 13, 1992

[54] FOCUS DETECTING APPARATUS
[75] Inventor: Ken Utagawa, Yokohama, Japan
[73] Assignee: Nikon Corporation, Tokyo, Japan
[21] Appl. No.: 585,268
[22] Filed: Sep. 19, 1990

Related U.S. Application Data

[63] Continuation of Ser. No. 394,655, Aug. 16, 1989, abandoned.

[30] Foreign Application Priority Data

Aug. 24, 1988 [JP] Japan .................. 63-211158

[51] Int. Cl.$^5$ .................... G03B 3/00; G03B 13/18
[52] U.S. Cl. .................................. 354/407
[58] Field of Search ............ 354/407, 408, 409

[56] References Cited

U.S. PATENT DOCUMENTS

| 4,373,791 | 2/1983 | Araki | 354/407 |
| 4,561,749 | 12/1985 | Utagawa | 354/406 |
| 4,816,663 | 3/1989 | Utagawa et al. | 354/402 |

FOREIGN PATENT DOCUMENTS

58-147142  8/1983  Japan .

Primary Examiner—W. B. Perkey
Assistant Examiner—Cassandra C. Spyrou
Attorney, Agent, or Firm—Shapiro and Shapiro

[57] ABSTRACT

A focus detecting apparatus adapted to be used with a taking lenses having different focal lengths comprises a plurality of re-focusing lenses for refocusing an image of an object obtained through the taking lens as a plurality of identical second images, at least two of the re-focusing lenses being arranged in positions where vignetting never occurs when the focus detecting apparatus is used with a taking lens having any focal length; a plurality of photoelectric converters for photoelectrically converting the second re-focused images, respectively, and for outputting output signals; and detectors for detecting a relative position of at least one pair of the second images on the basis of output signals from the photoelectric converters.

32 Claims, 9 Drawing Sheets

FOCUS DETECTING APPARATUS

This is a continuation of application Ser. No. 394,655 filed Aug. 16, 1989, now abandoned.

BACKGROUND OF THE INVENTION

1. Field of the Invention

The present invention relates to a focus detecting apparatus for detecting the focus of a camera and the like.

2. Related Background Art

Figure 9:
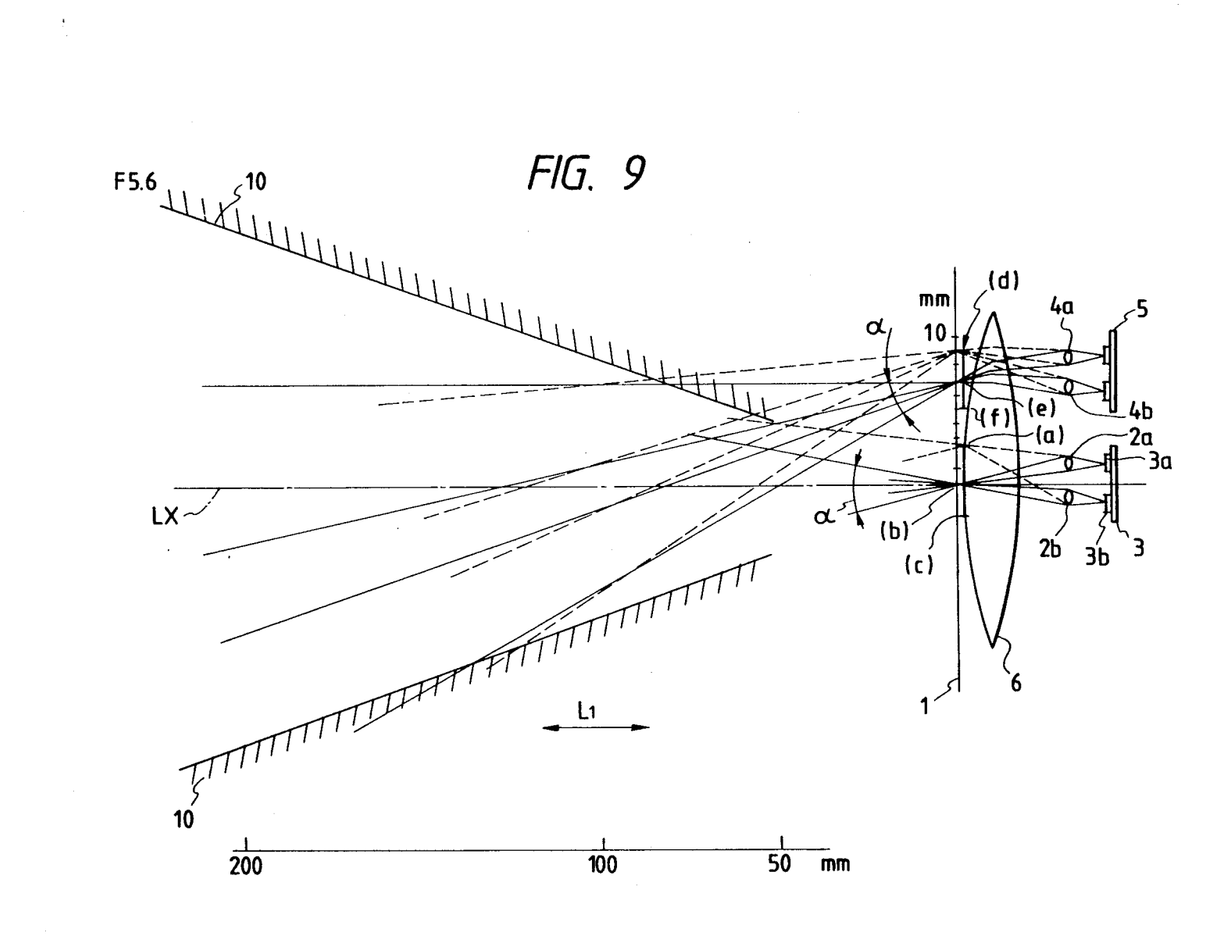
FIG. 9 is a view showing light paths in a conventional focus detecting apparatus.

In the past, a focus detecting apparatus as shown in FIG. 9 has already been known. In such conventional focus detecting apparatus, a zone (a)-(c) situated on a focus detecting plane 1 and having a center (b) positioned on an optical axis LX of a phototaking lens ("taking lens") with an extent of the order of +2-3 mm is used as a focus detecting area, and an image in this area is focused on image sensors 3a and 3b positioned on an IC substrate 3 through the medium of a pair of re-focusing lenses 2a and 2b, whereby a focus of the taking lens is determined by detecting the relative image displacement on the basis of image from the image sensors 3a, 3b.

In a focus detecting apparatus for a single lens reflex camera, it is necessary to prevent vignetting from occurring in an optical focus detecting system in the case of an interchangeable lens having an aperture F value of the order of F 5.6. In many cases, a position of an exit pupil of a taking lens having the aperture F value of F 5.6 exists anywhere in a range of 50 mm-200 mm, as shown in a hatched zone. In order to avoid vignetting in the lens having the aperture F value of F 5.6 wherein the position of the exit pupil exists in such range, it is necessary that the divergence $\alpha$ of a bundle of the detecting light is set to have a value of F 7 or thereabout.

Further, when the aperture or openings of the re-focusing lenses 2a, 2b are projected on the position corresponding to the exit pupil position of 100 mm or thereabout (a range shown by $L_1$ in FIG. 9) by means of a field lens 6, it will be possible to detect the focus of the lens having the aperture value of F 5.6 wherein the position of the exit pupil exists within the range of 50 mm-200 mm, without the occurrence of vignetting, by the use of light beams (shown by broken lines) passing through the points (a), (c) corresponding to the positions of the image heights of 2-3 mm measured from the optical axis LX. With such arrangement, in the conventional focus detecting apparatus, it is possible to detect the focus of the lens without the occurrence of vignetting within the range corresponding to the image height of 3 mm or thereabout.

It is desired that the focus detecting be performed by the use of a focus detecting area positioned away from the optical axis of the lens by 3-4 mm or more. To this end, for example, as shown in FIG. 9, re-focusing lenses 4a, 4b and IC substrate 5 are arranged to obtain a focus detecting area included in a zone (d)-(e)-(f) having a central point (e) corresponding to the position of the image height of 7 mm. Now, this focus detecting optical system is so designed that the apertures of the re-focusing lens 4a, 4b provide a conjugate image on a position corresponding to the exit pupil position of substantially 100 mm with the aid of the field lens 6. In this case, as apparent from FIG. 9, it is possible to avoid vignetting for the taking lens having the aperture value of F 5.6 by the use of the focus detecting area (d)-(e)-(f), only when the position of the exit pupil of the taking lens exists in the range $L_1$ having a value of 100 mm or thereabout. Accordingly, in this case, the kind of available interchangeable lenses is limited, and, thus, many problems arise in practice.

SUMMARY OF THE INVENTION

An object of the present invention is to provide a focus detecting apparatus which can correctly detect the focus of a taking lens having various exit pupil positions even when a focus detecting area has its center away from an optical axis of the taking lens.

The present invention is applied to a focus detecting apparatus which detects a focus of a taking lens by the use of a focus detecting area having its center away from an optical axis of the taking lens.

Figure 2:
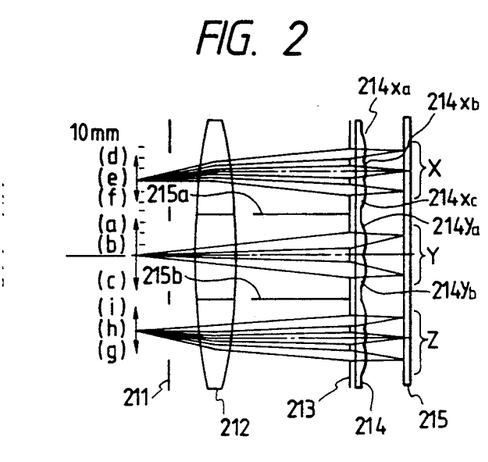
FIG. 2 is an enlarged view of the focus detecting optical systems.

The above object is achieved by providing a focus detecting apparatus comprising at least three re-focusing optical systems (for example, shown by reference numerals 214xa, 214xb, 214xc in FIG. 2) for re-focusing a light image of an object formed on a presumed focal plane by a taking lens onto a focus detecting area as at least three identical light images, at least three image sensors (for example, shown by reference numerals Xa, Xb, Xc in FIG. 3C) for photoelectrically converting the at least three light images, respectively, and a focus detection means for detecting the relative image displacement between a pair of light images on the basis of at least two outputs from the three image sensors.

The focus detecting apparatus may further include a judging means for judging two image sensors having no vignetting among three image sensors on the basis of information presenting the fact of whether or not vignetting is generated in the three-re-focusing optical systems.

In the focus detecting area not including the optical axis of the taking lens, three focus detecting light images are projected onto the three image sensors, respectively, by means of the three-re-focusing lenses. By properly determining a position of a conjugate image of the pupil of the focus detecting optical system and a position of the exit pupil of the taking lens, even if either one of two outer light images (among three light images) is vignetted, the other outer light image is not vignetted. Thus, it is possible to detect the focus of the lens on the basis of the outputs from the pair of image sensors on which a central light image and the non-vignetted outer light image are projected, respectively.

BRIEF DESCRIPTION OF THE DRAWINGS

FIGS. 1A to 6 illustrate an embodiment of the present invention, where

FIGS. 11 to 13 show a further embodiment of the present invention, where

FIGS. 14 to 16 are views for explaining a method for avoiding false focusing, where

DESCRIPTION OF THE PREFERRED EMBODIMENTS

The present invention will now be explained with reference to the accompanying drawings.

First of all, a first embodiment of the present invention will be explained in connection with FIGS. 1A to 6.

Figures 1A, 1B:
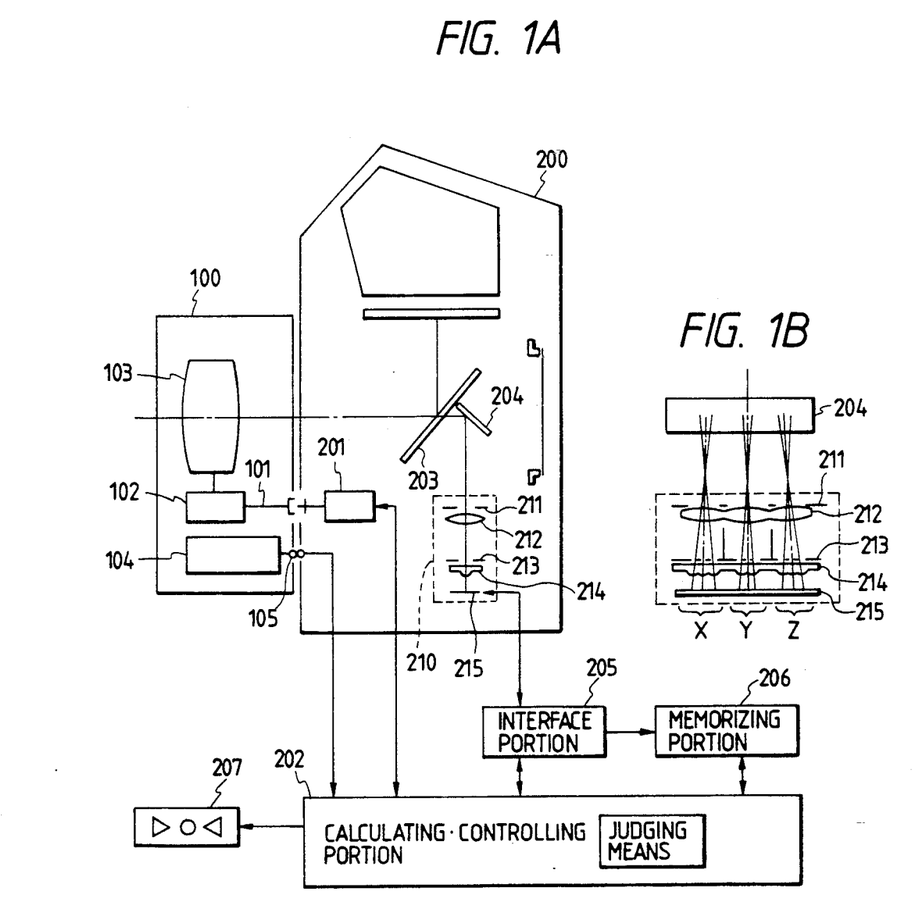
FIG. 1A is a block diagram showing the whole construction of a focus detecting apparatus.
FIG. 1B is a plan view of focus detecting optical systems looked at from the side of a film.

In FIG. 1A, a lens mount 100 of an interchangeable taking lens is designed that a coupler 101 receives a driving force from a lens driving device 201 in a camera body 200 and a movable lens 103 is shifted by the driving force through a gear train 102, as in the conventional mechanism. Information regarding an aperture F value of the taking lens and a position of an exit pupil of the taking lens is stored in a memory circuit 104 provided in the lens mount 100 of the taking lens, and the data stored in the memory circuit can be read out by a calculating/controlling portion 202 in the camera body through a contact 105 associated with the camera body 200.

A portion of light passed through the taking lens is directed to an optical system 210 of the focus detecting apparatus through a central semi-transparent portion of a quick return mirror 203 and a sub-mirror 204. In this embodiment, as shown in FIG. 1B, the focus detecting optical system 210 comprises an optical system Y arranged on an optical axis of the taking lens, and two optical systems X and Z arranged symmetrically with respect to the optical axis of the taking lens and situated away from the optical axis by a predetermined distance, as in the conventional case. Each optical system X, Y, Z includes a viewing field diaphragm 211 for eliminating light other than light in a focus detecting area, a field lens 212, an aperture plate 213 for determining a pupil of a re-focusing lens, and the above-mentioned re-focusing lens 214, and an IC substrate 215 having a plurality of image sensors. Incidentally, FIG. 1B is a view showing the focus detecting optical system 210 looked at from the side of a film.

Each image output regarding a light image formed on the respective image sensor of the respective optical system X, Y, Z is stored in a memorizing portion 206 through an interface portion 205 in FIG. 1A. The calculating/controlling portion 202 calculates a relative image displacement with regard to a pair of image outputs having different parallax in a wellknown manner, and, the lens driving device 201 is driven by a predetermined amount on the basis of the calculated result to perform the focusing operation. Also, a display device 207 is illuminated.

Figure 3A:
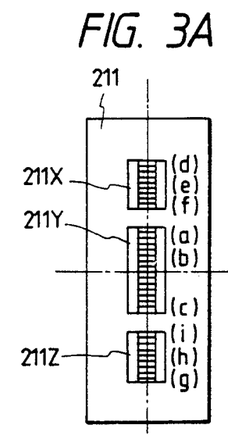
FIGS. 3A to 3C are plan views showing a viewing field diaphragm, aperture plate and IC substrate, respectively.
Figure 3B:
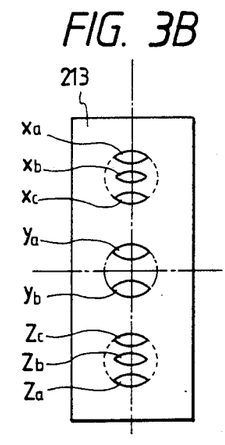
Figure 3C:
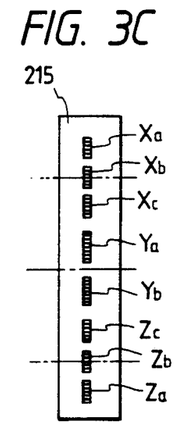

FIGS. 2 and 3 show the elements of FIG. 1B with more detail, where FIG. 2 is a side view of each focus detecting optical system Y, X, Z, FIG. 3A is a plan view of the viewing field diaphragm 211, FIG. 3B is a plan view of the aperture plate 213, and FIG. 3C is a plan view of the IC substrate 215. The viewing field diaphragm 211 has three apertures or openings 211Y, 211X and 211Z for the optical system Y, X and Z. Similarly, the aperture plate 213 has apertures or stops (pupils) ya, yb, xa, xb, xc, za, zb and zc for the three optical systems Y, X and Z. As seen from FIG. 3B, three pupils xa, xb and xc are so arranged that centers of the pupils are aligned with each other on a single straight line. Similarly, the IC substrate 215 has image sensors Ya, Yb, Xa, Xb, Xc, Za, Zb and Zc for the three optical systems Y, X and Z. Incidentally, the optical systems X and Z are arranged symmetrically with respect to the optical axis of the taking lens. Since the optical system Z is identical to the optical system X except for the symmetrically arranged position thereof, explanation of the optical system Z will be omitted.

Further, as shown in FIG. 2, the re-focusing lens assembly of the optical system Y comprises a pair of lenses 214ya and 214yb as in the conventional case, and the re-focusing lens assembly of the optical system X comprises three lenses 214xa, 214xb and 214xc. In addition, in this embodiment, the field lens 212 forms a conjugate image of each aperture of the refocusing lens onto a position corresponding to the exit pupil position of substantially 100 mm with divergence α of a bundle of the detecting light having a value of the order of F 7.

Further, the image in the focus detecting area (a)-(b)-(c) on the optical axis of the taking lens is formed on the image sensors Ya and Yb, and the image in the focus detecting area (d)-(e)-(f) is formed on the image sensors Xa, Xb and Xc through the three re-focusing lenses 214xa, 214xb, 214xc and three pupils xa, xb and xc arranged in front of these refocusing lenses. The reference numerals 215a and 215b shown in FIG. 2 designate shield plates for blocking stray light from the adjacent optical system.

Next, a relation between the exit pupil of the mounted taking lens and vignetting of the bundle of detecting light will be explained in connection with the focus detecting optical system X as constructed above, with reference to FIGS. 4 and 5.

Figure 4:
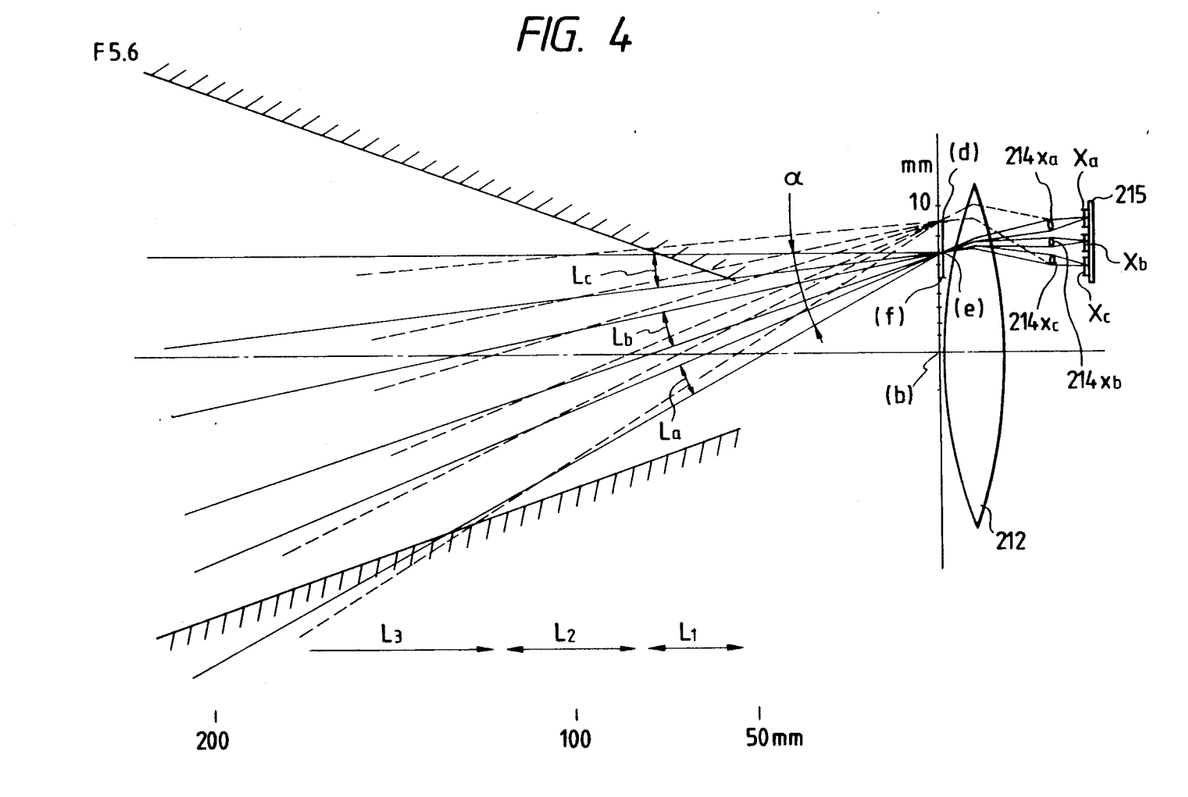
FIG. 4 is a view showing light paths in the focus detecting optical system X for explaining the vignetting of a bundle of the detecting light in such optical system.
Figure 5:
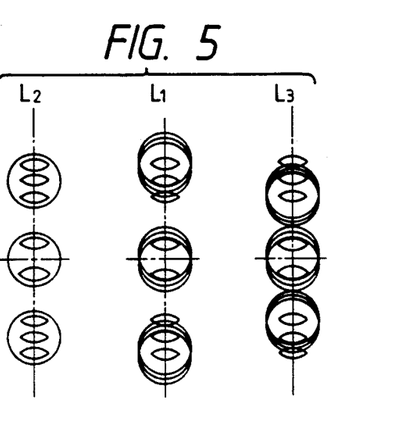
FIG. 5 is a view for explaining various cases when an exit pupil of a taking lens in different positions is projected onto a pupil position of the diaphragm through a field lens.

FIG. 4 is a view for explaining in which range of the exit pupil position the bundle of the detecting light of the optical system X is vignetted when the lens has the aperture value of F 5.6, and FIG. 5 is a view showing the exit pupil projected onto the pupil position of the aperture plate 213 by the field lens 212.

From FIGS. 4 and 5, the following matters can be understood:

(1) As to the taking lens having the exit pupil position included in the range $L_2$ of 100 mm or thereabout, the bundles of the detecting light La, Lb and Lc for the re-focusing lenses 214xa, 214xb and 214xc are not vignetted, and, accordingly, all of the three image outputs from the image sensors Xa, Xb and Xc can be used for detecting the focus of the taking lens.

(2) As to the taking lens having the exit pupil position included in the range $L_1$ of the order of 50 mm–80 mm, since the bundle of the detecting light Lc is vignetted, the image output from the image sensor Xc is not available. However, since the bundles of the detecting light La and Lb are not vignetted, it is possible to detect the focus of the taking lens by detecting the image displacement on the basis of the image outputs from the image sensors Xa and Xb.

(3) As to the taking lens having the exit pupil position included in the range $L_3$ of the order of 120 mm–200 mm, since the bundle of the detecting light La is vignetted, the image output from the image sensor Xa is not available. However, since the bundles of the detecting light Lb and Lc are not vignetted, it is possible to detect the focus of the taking lens by detecting the image displacement on the basis of the image outputs from the image sensors Xb and Xc.

Regarding the optical system Y, since the bundles of the detecting light are not vignetted at any time, the image outputs from the image sensors Ya and Yb can be used for detecting the focus of the taking lens. That is to say, in the focus detecting optical system Y arranged on the optical axis of the taking lens, the focus of the taking lens can always be detected by the pair of image sensors Ya and Yb.

Now, in the focus detecting optical system Z, it is determined which image outputs of the image sensors should be used as a pair of image outputs having different parallax, by the calculating/ controlling portion 202, as shown by the following table:

| P0 (mm) | A | B | C |
|---|---|---|---|
| 50–59.9 | $F \leq 2.8$ | $2.8 < F \leq 5.6$ | |
| 60–69.9 | $F \leq 3.5$ | $3.5 < F \leq 5.6$ | |
| 70–79.9 | $F \leq 4$ | $4 < F \leq 5.6$ | |
| 80–89.9 | $F \leq 5$ | $5 < F \leq 5.6$ | |
| 90–109.9 | $F \leq 5.6$ | | |
| 110–129.9 | $F \leq 5$ | | $5 < F \leq 5.6$ |
| 130–149.9 | $F \leq 4.5$ | | $4.5 < F \leq 5.6$ |
| 150–199 | $F \leq 4$ | | $4 < F \leq 5.6$ |
| 200–300 | $F \leq 3.5$ | | $3.5 < F \leq 5.6$ |

In the above-mentioned focus detecting optical systems X and Z, as shown in the above table, on the basis of the exit pupil position and aperture F value of the mounted taking lens, a condition A that all of the bundles of the detecting light La, Lb and Lc are not vignetted, a condition B that the bundle of the detecting light Lc is vignetted, and a condition C that the bundle of the detecting light La is vignetted can be previously judged. For example, if the exit position exists in the range of 90–109.9 mm and the aperture F value is 5.6 or less, the condition A is selected. Similarly, if the exit pupil position exists in the range of 50–59.9 mm and the aperture F value is more than 2.8 and less than 5.6 (including 5.6), the condition B is selected, and, if the exit pupil position exists in the range of 110–129.9 mm and the aperture F value is more than 5 and less than 5.6 (including 5.6), the condition C is selected.

In the case of the condition A, in order to select a pair of the images, as to the optical system X, either the pair of the image sensors Xa and Xb, or the pair of the image sensors Xb and Xc, or the pair of the image sensors Xa and Xc can be used; and, as to the optical system Z, either the pair of the image sensors Za and Zb, or the pair of the image sensors Zb and Zc, or the pair of the image sensors Za and Zc can be used. On the other hand, in the case of the condition B, in order to select a pair of the images, as to the optical systems X and Z, the pair of the image sensors Xa and Xb, and the pair of the image sensors Za and Zb are used, respectively. In the case of the condition C, in order to select a pair of the images, as to the optical systems X and Z, the pair of the image sensors Xb and Xc, and the pair of the image sensors Zb and Zc are used, respectively.

Incidentally, the selection of the condition A will be described later.

Figure 6:
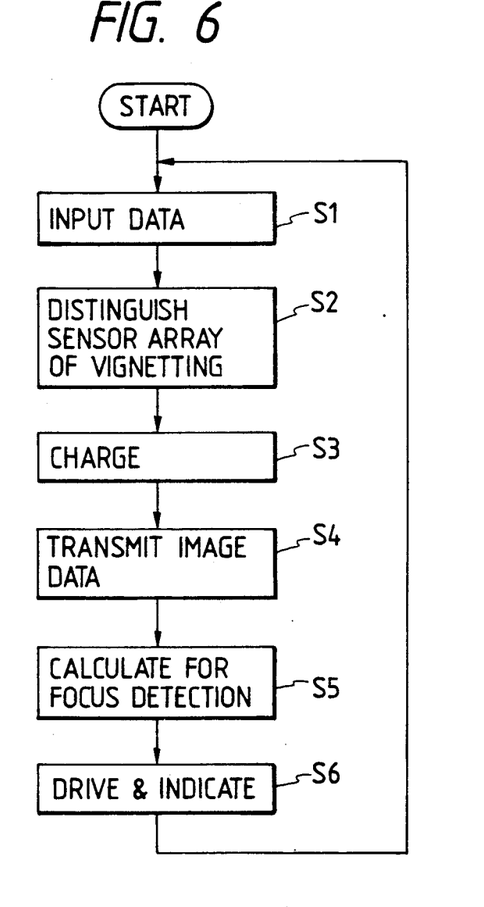
FIG. 6 is a flow chart showing a processing sequence for the focus detection and calculation.

Next, the focus detecting operation will be explained with reference to a flow chart shown in FIG. 6.

In a step S1, the calculating/controlling portion 202 reads out the aperture F value and the exit pupil position P0 of the taking lens from the memorizing portion 104. In a step S2, the calculating/ controlling portion 202 judges which condition A, B or C corresponds to the mounted taking lens, on the basis of the above table. In this way, any image sensor in which the light is vignetted is distinguished from the other sensors. Then, in a step S3, the image sensors start to be charged, and, when predetermined charges are accumulated in the image sensors, in a step S4 the image data is transmitted to the memorizing portion 206, thus storing the data therein. Now, the charging time is controlled by the calculating/controlling portion 202 and the interface portion 205 in the well-known manner. In this case, since it takes a relatively long time to transmit the data, if the data transmission regarding the image sensor for which it is judged that the light is vignetted is omitted, the transmission operation will be improved. For example, when a CCD is used as each of the image sensors, the data transmission of the CCD for which it is judged that the light is vignetted (among three CCD's) is omitted.

Next, in a step S5, the calculation for the focus detection is executed by using the pair of the image sensors for which that the light thereof is not vignetted, and, in a step S6, the movable lens 103 is driven and the display device 207 is energized to indicate that the lens is being moved, on the basis of the calculated result obtained in the step S5.

Incidentally, it may be judged which image outputs of the image sensor pair can be used, only on the basis of the information regarding the exit pupil position of the taking lens. For example, when the exit pupil position is less than 100 mm (P0 < 100 mm), the pair of the image sensors Xa, Xb and the pair of the image sensors Za, Zb may always be used, whereas, when P0 $\geq$ 100 mm, the pair of the image sensors Xb, Xc and the pair of the image sensors Zb, Zc may be used.

Next, alterations of the above-mentioned embodiment will be explained.

Figure 7A:
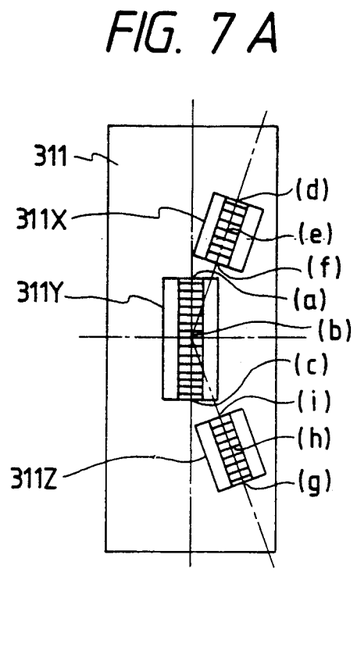
FIGS. 7 and 8 show alterations of the invention, respectively.
Figure 7B:
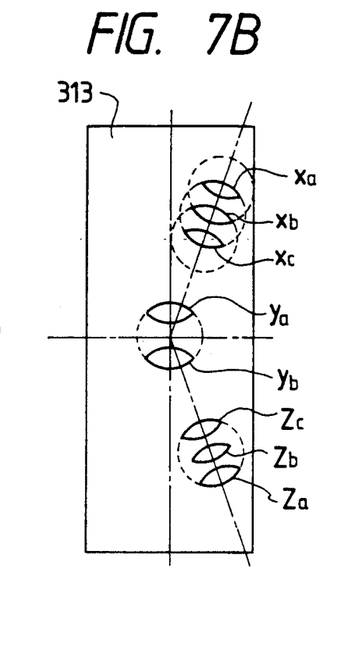

In the above-mentioned embodiments, while an example in which three focus detecting areas (a)-(b)-(c), (d)-(e)-(f) and (g)-(h)-(i) are aligned to each other on a single straight line as shown in FIG. 3 was explained, the present invention is not limited to this example; for example, as shown in FIG. 7, openings 311X and 311Z of a viewing field diaphragm 311 may be so designed that the outer focus detecting area (d)-(e)-(f) is inclined with respect to the central focus detecting area (a)-(b)-(c) and pupils xa, xb and xc of an aperture plate 313 may similarly be inclined. However, preferably, the centers of the pupils xa, xb and xc are aligned with each other on a single straight line.

In a layout of the optical elements shown in FIG. 7, an extension line of the focus detecting area (d)-(e)-(f) extends substantially toward the optical axis of the taking lens, and the centers of the pupils xa, xb and xc are situated on a common straight line extending toward the optical axis of the taking lens. Such layout is similar to that shown in FIG. 3, and has an advantage that the diameters of the pupils xa, xb and xc can be increased to obtain a bright optical system and to improve the detecting efficiency.

Figure 8A:
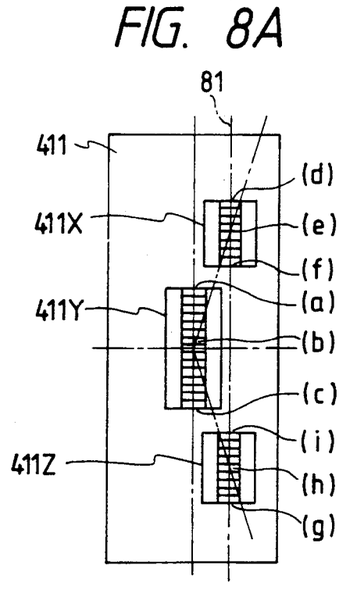
Figure 8B:
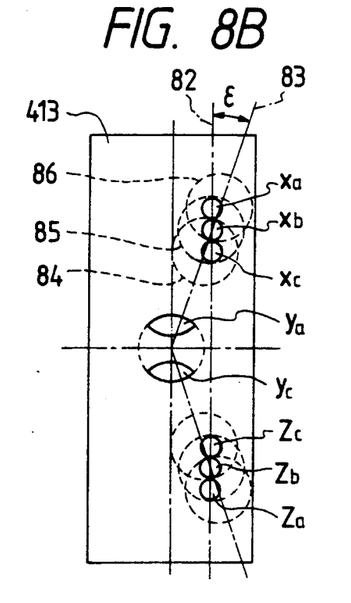

Further, so long as a desired amount of light can be introduced into the image sensors, a viewing field diaphragm 411 and an aperture plate 413 as shown in FIG. 8 can be used. More particularly, an opening 411X defining the focus detecting area (d)-(e)-(f) may be arranged in parallel with an opening 411Y defining the focus detecting area (a)-(b)-(c) and the direction of a line connecting the centers of the pupils xa, xb and xc may coincide with the direction of the focus detecting area (d)-(e)-(f). That is to say, a centerline 81 is parallel to a centerline 82. The optical system Z is similarly constructed.

Now, in correspondence to the exit pupil position of the taking lens, a zone where the vignetting does not occur will change or vary along a straight line 83 passing through the optical axis, as shown by broken line circles 84, 85 and 86. Accordingly, if it is desired to obtain the pupil where the vignetting does not occur in such a condition, the diameter of each pupil xa, xb, xc shown in FIG. 8 must be smaller than that of the pupil shown in FIG. 3 or FIG. 7. In this case, since the amount of light received by each image sensor is reduced, to worsening the detecting ability, the following limitation will occur. That is to say, an angle $\epsilon$ between the direction 81 along which the focus detecting areas are aligned and the straight line 83 connecting the centers of the focus detecting areas to the optical axis of the taking lens is desired to be selected to have a value of 10 degrees or less, and, such angle is limited to 30 degrees and thereabout at the most, as shown in FIG. 8.

In the above-mentioned embodiments, while the image sensor wherein the light thereof is being vignetted is distinguished from the other image sensors on the basis of the data (such as the exit pupil position, aperture F value and the like) from the memorizing portion 104 arranged in the taking lens, such image sensor may be distinguished without using the data from the taking lens.

For example, if the calculating/controlling portion 202 judges the fact that there is no lens data, the presence of the vignetting can be judged on the basis of data obtained in association with the calculation for the focus detection.

The applicant has proposed a method wherein the maximum relative position and the maximum relative amount Cext were sought from the paired image data representative of the outputs $a_1 \ldots a_n$, $b_1 \ldots b_n$ of the pixels constituting the image sensors and the focus was detected on the basis of these data, as disclosed in the U.S. Pat. No. 4,561,749.

That is to say, if the relative shift amount between both images is L and the relative amount C(L) between the both images is defined as follows:

$$C(L) = \sum_i |a_i - b_{i+L}|,$$

the value C(L) is sought with respect to successive shift numbers L. When the minimum value of such relative amount C(L) is $C_0$ and values adjacent to said minimum value are $C_1$, $C_{-1}$, respectively, the ultimate or limiting value Cext of the incorporated relative amount will be given by the following equation:

$$C_{ext} = C_0 - 0.5 \times |C_{-1} - C_1|.$$

If there is no distorting due to vignetting of both images and the both images can be overlapped with the relative shift, including a fraction, the above value Cext will be adequately smaller near zero, in comparison with a value E $(= \text{Max } \{C_1 - C_0, C_{-1} - C_0\})$ On the other hand, if vignetting occurs and both images cannot be completely overlapped with the relative shift, the above value Cext will not become smaller.

Accordingly, by seeking the value Cext as to the image data regarding the paired image sensors Xa, Xb and by seeking the value Cext as to the image data regarding the other paired image sensors Xb, Xc and by comparing these two values Cext, it is possible to distinguish the image sensors having no vignetting as the sensors associated with the smaller value Cext, from the other sensors.

Incidentally, it is possible to use four divided pupils. In this case, however, there arises a problem that the area of each pupil becomes smaller, increasing the minimum brightness limitation, and the whole apparatus is large-sized. Accordingly, when the range having the image height of 5-10 mm is used as the focus detecting area, it is optimum to use three divided pupils.

According to the above mentioned embodiments of the present invention, since at least three light images are projected onto the corresponding image sensors in the focus detecting area off of the optical axis, regardless of the position of the exit pupil of the taking lens, the image outputs regarding the pair of light images having no vignetting can always be obtained, thus permitting accurate focus detection even with a focus detecting area not including the optical axis.

Next, another embodiment of the focus detecting apparatus using three re-focusing optical systems will be explained.

In the case of the above-mentioned condition A, i.e., when all of the three re-focusing optical systems have no vignetting, three combinations of the image sensors can be used for detecting the image displacement between two images. That is to say, as to the optical system X, the combination of the image sensors Xa, Xb, or Xb, Xc or Xa, Xc can be used for detecting the image displacement. If a distance between a pair of the openings used among the openings (xa, xb, xc in FIG. 3B) of the used refocusing optical system is referred to as "reference line length", there is obtained a feature that, as the reference line length is increased, since a defocus amount corresponding to a predetermined image displacement becomes smaller, the accuracy of the focus detection is improved and that, as the reference line length is decreased, the focus detection can be performed in a wider defocus range. Therefore, it is preferable to utilize such feature conveniently or effectively.

Figure 10:
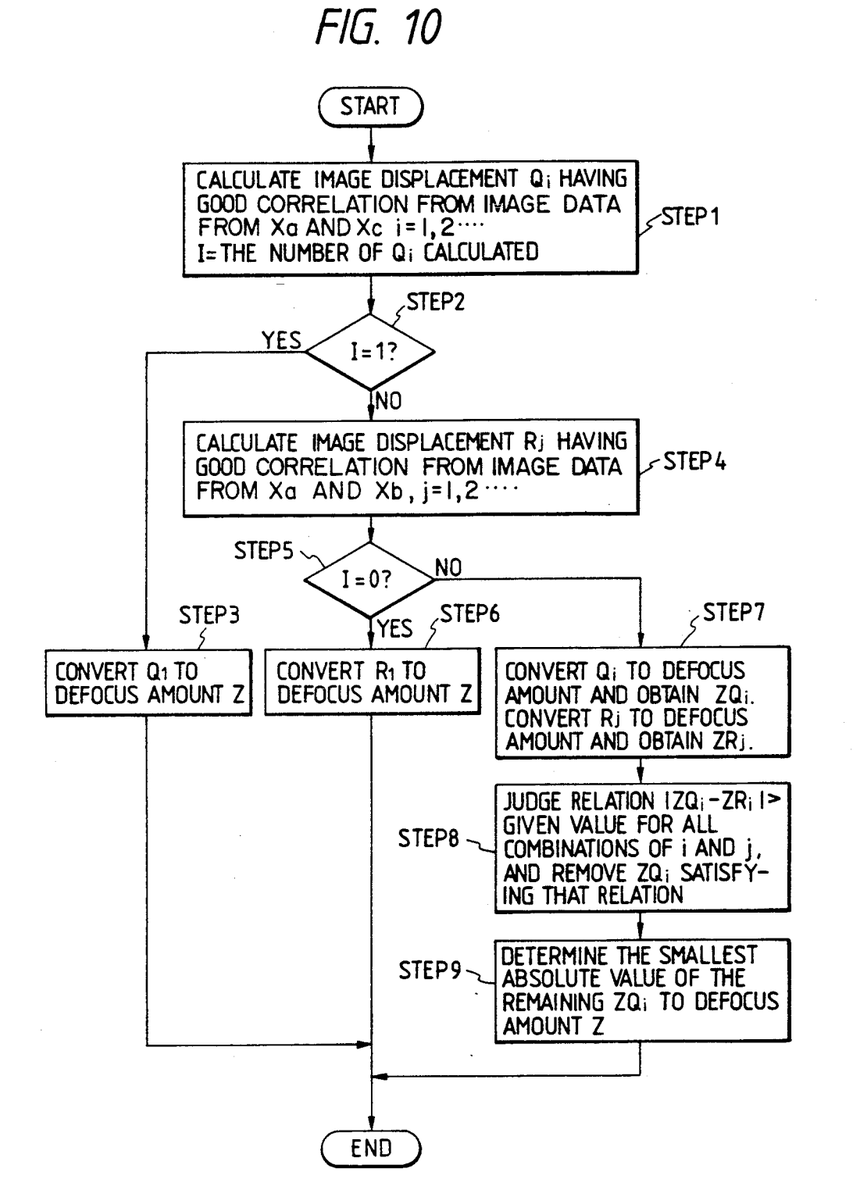
FIG. 10 is a flow chart showing a processing sequence for the focus detecting apparatus according to another embodiment of the present invention.

As to an embodiment for utilizing the feature, the processing sequence will be explained with reference to a flow chart shown in FIG. 10.

First of all, the calculating/controlling portion detects the image displacement with respect to the paired image sensors Xa and Xc regarding the re-focusing lenses xa and xc having the long reference line length (in a step 1), and, if it is possible to detect such image displacement (I=1), the defocus amount is calculated on the basis of the detected result (in a step 3), thus driving the lens and activating the display. If the defocus amount is large, since it is impossible to detect the image displacement on the basis of the outputs of the sensors Xa and Xc (I=0 in a step 2), in this case, the calculating/ controlling portion further detects the image displacement with respect to the paired image sensors Xa, Xb or Xb, Xc (in a step 4), and the obtained image displacement is converted into the defocus amount (in a step 6), thus driving the lens and activating the display. Of course, the image displacements regarding the plurality of pairs of the sensors (Xa, Xc) and (Xa, Xb), or (Xa, Xc) and (Xa, Xb) and (Xb . Xc) may have previously been calculated. And, when the defocus amount is large, the magnitude or direction of the defocus amount may be determined on the basis of the calculated image displacement regarding the sensor pair (Xa, Xb) or (Xb, Xc).

In this way, as to a bright taking lens, it is possible to obtain the extension of the defocus judging zone or the front and rear pin judging zone, and the improvement of the focusing accuracy in the vicinity of the focus.

Next, a further embodiment of the focus detecting apparatus using three re-focusing optical systems will be explained.

Figure 11:
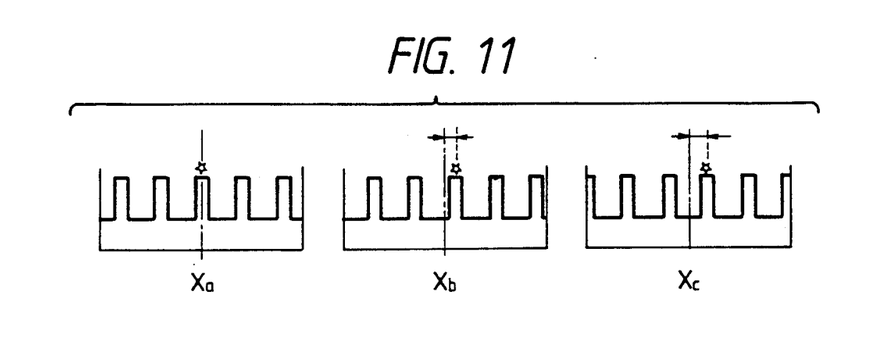
FIG. 11 shows image outputs of image sensors.

FIG. 11 shows the image outputs when a cyclic pattern is projected onto the image sensors Xa, Xb and Xc, where the star marks indicate the same portion of an object.

Generally, in the conventional focus detecting apparatus utilizing the image displacement detection, with an object having such cyclic pattern, since the correlation between the images is good even when the image is deviated by one complete cycle, it is feared that erroneous judgement regarding the focus detection occurs, and, accordingly, the conventional focus detecting apparatus cannot deal with an object having the cyclic pattern effectively.

Figure 12:
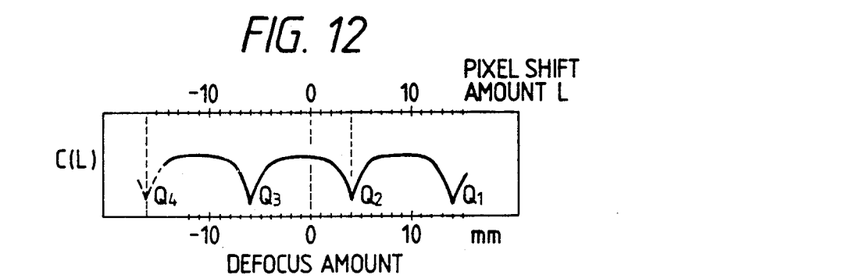
FIG. 12 is a graph showing a relation between a pixel shift amount and a defocus amount in connection with the image sensors Xa and Xc.

More particularly, FIG. 12 is a graph showing the relative amount C(L) when the relative shift amount L is varied with respect to the image outputs of the image sensors Xa and Xc, where an upper scale indicates a pixel shift amount L and a lower scale indicates a corresponding defocus amount of the taking lens. As apparent from FIG. 12, there are several points $Q_1, Q_2, Q_3, Q_4, \ldots$ each of which indicates the image displacement providing the good correlation between images. If the point $Q_2$ is selected, an actual focus position is obtained, but, if the other points are selected, false or erroneous focus will be obtained.

Figure 13:
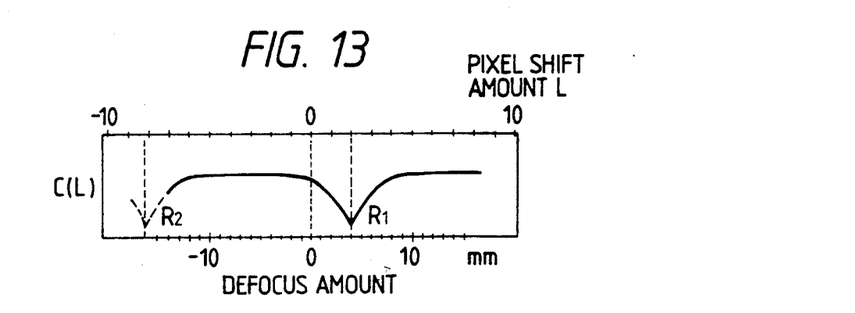
FIG. 13 is a graph showing a relation between a pixel shift amount and a defocus amount in connection with the image sensors Xa and Xb.

FIG. 13 is a graph showing the relative amount C(L) when the relative shift amount L is varied with respect to the image outputs of the image sensors Xa and Xb, where an upper scale also indicates the pixel shift amount L like FIG. 12, but has a different scale magnitude. The reason why the scale magnitudes differ between FIG. 12 and FIG. 13 is that the reference line lengths for the detection(distance between the paired re-focusing lenses) differ from each other, and that when the re focusing lenses are arranged equidistantly as shown in FIG. 3B the image displacement amounts regarding the same defocus amount of the taking lens differ by twice between FIG. 12 (using the lenses xa and xc) and FIG. 13 (using the lenses xa and xb).

As apparent from the comparison between FIG. 12 and FIG. 13, it is possible to eliminate false focus due to the points $Q_3$ and $Q_1$ by comparing them with the scale regarding the defocus amount. Although there is the possibility of false focus due to the point $Q_4$, in many cases, there is no problem if the point $Q_2$ having the smaller defocus amount is selected (since the probability that the taking lens is positioned at the largely defocused position is very low).

Figure 14A:
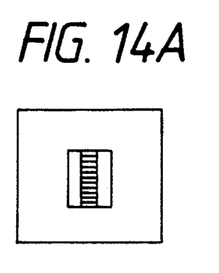
FIG. 14 is a view similar to FIG. 3, but showing non-equidistant apertures.
Figure 14B:
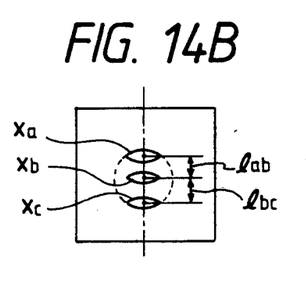
Figure 14C:
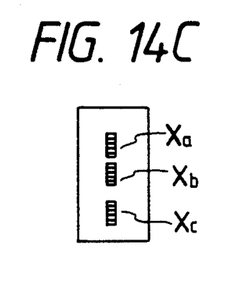
Figure 15:
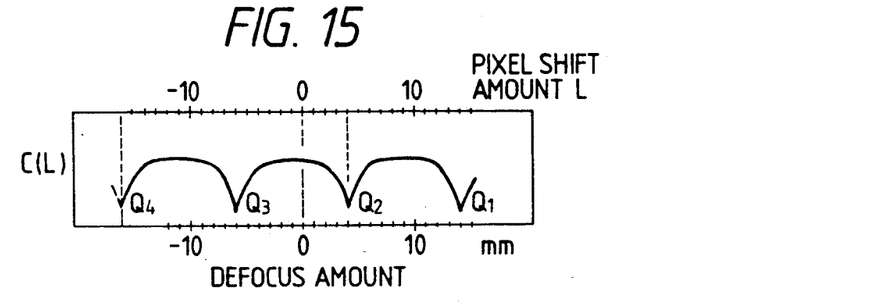
FIG. 15 is a graph similar to FIG. 12.
Figure 16:
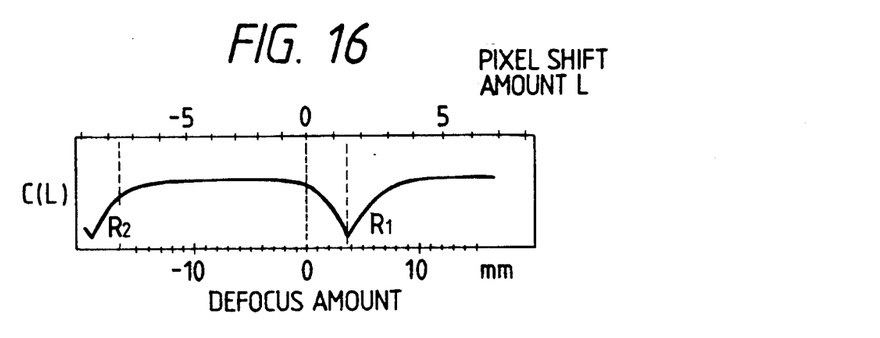
FIG. 16 is a graph similar to FIG. 13.

Next, a method for completely eliminating false focus will be explained. FIG. 14 shows a view similar to FIG. 3, except that the apertures xa, xb, xc of the re-focusing lenses are arranged nonequidistantly (l ab≠l bc). In this example, the relation regarding the image outputs of the image sensors Xa, Xc corresponding to the apertures xa, xc is shown in a graph of FIG. 15, and the correlation regarding the image outputs of the image sensors Xa, Xb corresponding to the apertures xa, xb is shown in a graph of FIG. 16. As seen from these FIGS., if there is no relation of a simple integral ratio between the reference line length (ab ; bc) between the apertures xa and xc and the reference line length (ab) between the apertures xa and xb, a point Qi in the graph of FIG. 15 does not coincide with a point Rj in the graph of FIG. 16, except that the point $Q_2$ coincides with the point $R_1$, which indicates the actual focus position. As to an extent or degree of the nonequidistant arrangement, when $$\left| \frac{lab - lbc}{lab + lbc} \right| = t,$$

the value t should be maintained in a range of t>0.02, and preferably be in a range of t>0.04. In any case, the value t is adequate if it belongs to a range of ≧0.1.

The processing sequence for eliminating erroneous detection due to such cyclic pattern will be explained with reference to the flow chart shown in FIG. 10. When a plurality of the correlations Qi regarding the outputs of the sensors Xa, Xc are sought in the step 1, in this case, since the number of the peaks of the correlation is plural, I≠1 and I≠0 are obtained, and the sequence goes to the step 4. In the step 4, the image displacement Rj having a good correlation regarding the image data of the sensors Xa and Xb is calculated. Next, since I≠0, the sequence goes to a step 7, where the defocus amounts ZQi, ZRj corresponding to the correlation positions Qi, Rj are calculated. In a step 8, in order to eliminate erroneous detection, the defocus amounts ZQi other than the defocus amounts ZQi coinciding with the defocus amounts ZRj on the defocus scale are removed (this step corresponding to a means for eliminating the erroneous detection). A step 9 determines the defocus amount having the smallest absolute value (among the remaining defocus amounts ZQi) as the defocus amount Z to be used. Such arrangement has an advantage that false focus regarding a cyclic pattern, which could not be eliminated by the conventional technique, can be effectively eliminated. Further, in this case, by slightly differentiating the reference line length between the re-focusing lenses xa and xb from the reference line length between the re-focusing lenses xa and xc, the eliminating efficiency performed by the eliminating means can be considerably improved.

Incidentally, this embodiment can also be applied to a distance measuring apparatus of a so-called outer light triangle type; in this case, the lenses xa, xb and xc act as focusing lenses for focusing an image of an object onto the image sensors.

What is claimed is:

1. A focus detecting or distance measuring apparatus comprising:
a plurality of image forming means for forming at least three substantially identical separated light images of an object having parallax between one another;
a plurality of photoelectric converter means for photoelectrically converting said light images, respectively, and for outputting output signals;
detection means for detecting a relative position between at least two pairs of said at least three light images on the basis of output signals from said photoelectric converter means, and for providing focus detection information corresponding to said relative position; and
eliminating means for comparing focus detection information corresponding to the relative position between said at least two pairs of light images for determining and eliminating erroneous focus detection information.

2. An apparatus according to claim 1, wherein said image forming means includes at least three field stops corresponding to said at least three images, respectively.

3. An apparatus according to claim 1, wherein said image forming means includes apertures xa, xb and xc arranged so as to satisfy the following condition:

$$\left| \frac{lab - lbc}{lab + lbc} \right| > 0.02$$

where lab and lbc correspond to respective distances between apertures xa and xb, and apertures xb and xc.

4. An apparatus according to claim 1, wherein said image forming means includes at least three pupil aperture members which are arranged successively with different distances between pairs of successive pupil aperture members.

5. An apparatus according to claim 1, wherein said detection means calculates a first correlation between a first pair of output signals and a second correlation between a second pair of output signals, respectively, and said eliminating means eliminates focus detection information when both of said calculated first and second correlations are not indictive of peak correlation values for a substantially common defocus amount.

6. A focus detecting apparatus adapted to be used with a taking lens, comprising:
means for re-focusing a first light image of an object obtained through said taking lens as at least three separated substantially identical secondary light images, said first light image being formed at a focus detection area that has its center away from an optical axis of said taking leans, said re-focusing means including at least three re-focusing optical systems arranged in positions where vignetting does not simultaneously occur with respect to at least two of said three re-focusing optical systems;
at least three photoelectric converter means disposed on image planes of said re-focusing optical systems, respectively, for generating output signals corresponding to said secondary light images, respectively; and
means for detecting relative displacement of said secondary light images formed by said at least two refocusing optical systems on the basis of output signals of photoelectric converter means corresponding to said at least two re-focusing optical systems.

7. An apparatus according to claim 6, further comprising means for limiting light forming said secondary light images to light from said focus detecting area.

8. An apparatus according to claim 6, wherein each of said photoelectric converter means comprises a separate array of pixel elements on which a corresponding light image is formed.

9. A focus detecting apparatus according to claim 6, wherein each of said at least three re-focusing optical systems has an optical axis which is not coincident with the optical axis of said taking lens.

10. A focus detecting apparatus according to claim 6, further including a judging means for judging whether vignetting occurs in each of said re-focusing optical systems, said judging means nullifying the output signal from said photoelectric converter means corresponding to said re-focusing optical systems where vignetting is being generated.

11. A focus detecting apparatus adapted to be used with a taking lens, comprising:
means for re-focusing a first light image of an object obtained through said taking lens as at least three separated substantially identical secondary light images, said first light image being formed at a focus detecting area that has its center away from an optical axis of said taking lens, said re-focusing means including at least three re-focusing lenses arranged in positions where vignetting does not simultaneously occur with respect to at least two of said three refocusing lenses;
at least three image sensors for photoelectrically converting said secondary light images, respectively, and for generating output signals; and
means for detecting relative displacement of said secondary light images formed by said at least two refocusing lenses on the basis of output signals of said image sensors corresponding to said at least two refocusing lenses.

12. An apparatus according to claim 11, further comprising means for limiting light forming said secondary light images to light from said focus detecting area.

13. An apparatus according to claim 11, wherein each of said image sensors comprises a separate array of pixel elements on which a corresponding light image is formed.

14. A focus detecting apparatus according to claim 11, wherein each of said at least three re-focusing lenses has an optical axis which is not coincident with the optical axis of said taking leans.

15. A focus detecting apparatus according to claim 14, further including a judging means for judging whether vignetting occurs in each of said refocusing lenses, said judging means nullifying the output signal from said image sensors corresponding to said re-focusing lenses where vignetting is being generated.

16. A focus detecting apparatus according to claim 14, wherein said at least three re-focusing lenses are arranged so that centers of said re-focusing lenses are situated on a single straight line.

17. A focus detecting apparatus according to claim 14, wherein said at least three re-focusing lenses are arranged so that a bent line is obtained by connecting centers of said re-focusing lenses.

18. A focus detecting apparatus adapted to be used with a taking lens, comprising:
    means for re-focusing a first light image of an object obtained through said taking lens as at least three separated substantially identical secondary light images, said first light image being formed at a focus detecting area that has its center away from an optical axis of said taking lens;
    at least three photoelectric converter means for photoelectrically converting said secondary light images, respectively, and for generating output signals;
    means for detecting relative position of a first pair of said secondary light images and relative position of a second pair of said secondary light images, respectively, on the basis of difference between output signals of corresponding photoelectric converter means; and
    means for judging focus on the basis of the detected relative position of one of said first and second pairs of said secondary light images that provides more accurate focus detection information than the other.

19. An apparatus according to claim 18, further comprising means for limiting light forming said secondary light images to light from said focus detecting area.

20. An apparatus according to claim 18, wherein each of said photoelectric converter means comprises a separate array of pixel elements on which a corresponding light image is formed.

21. A focus detecting apparatus adapted to be used with a taking lens, comprising:
    first re-focus means for re-focusing a first light image of an object obtained through said taking lens as a plurality of separated substantially identical secondary light images, said first light image being formed at a focus detecting area having its center near an optical axis of said taking lens, said first re-focus means including two re-focusing lenses and two image sensors for photoelectrically converting said secondary light images, respectively, and for generating output signals; and
    second re-focus means for re-focusing a second light image of an object obtained through said taking lens as at least three separated substantially identical secondary light images, said second light image being formed at a focus detecting area having its center away from said optical axis of said taking lens, said second re-focus means including at least three re-focusing lenses arranged in positions where vignetting does not simultaneously occur with respect to at least two of said three re-focusing lenses and at least three image sensors for photoelectrically converting the last-mentioned secondary light images, respectively, and for generating output signals.

22. An apparatus according to claim 21 further comprising third re-focus means for re-focusing a third light image of an object obtained through said taking lens as at least three separated substantially identical secondary light images, said third light image being formed at a focus detecting area having its center away from said optical axis of said taking lens, said second and third re-focusing means being substantially symmetrically positioned with respect to said optical axis, said third re-focus means including at least three re-focusing lenses arranged in positions where vignetting does not simultaneously occur with respect to at least two of the last-mentioned three re-focusing lenses and at least three image sensors for photoelectrically converting the last-mentioned secondary light images, respectively, and for generating output signals.

23. An apparatus according to claim 22, further comprising means for limiting light forming said secondary light images to light from the corresponding focus detecting area.

24. An apparatus according to claim 22, wherein each of said image sensors comprises a separate array of pixel elements on which a corresponding light image is formed.

25. An apparatus according to claim 22, wherein the image sensors of the first, second, and third refocusing means are arranged along a single straight line.

26. An apparatus according to claim 22, wherein the image sensors of the first, second, and third re-focusing means are arranged along a bent line.

27. A focus detecting apparatus adapted to be used with a taking lens, comprising:
    means for re-focusing a light image of an object obtained through said taking lens as at least three separated substantially identical secondary light images, said re-focusing means having at least three openings spaced along a line and forming said secondary light images from light beams passed through said openings, respectively;
    at least three means for photoelectrically converting said secondary light images, respectively, and for generating output signals;
    means for detecting respective relative displacements of at least two pairs of said secondary light images on the basis of the output signals of said converting means; and
    focus detecting means for detecting focus on the basis of said relative displacement of one of said at least two pairs of said secondary light images corresponding to a pair of said openings having a distance therebetween smaller than the distance between another pair of said openings, when an amount of said detected relative displacement is larger than a predetermined amount, and for detecting focus on the basis of said relative displacement of another of said at least two pairs of secondary light images corresponding to said another pair of said openings, when an amount of said detected relative displacement is smaller than said predetermined amount.

28. An apparatus according to claim 27, wherein said openings are all disposed away from and at the same side of an optical axis of said taking lens.

29. An apparatus according to claim 27, wherein each of said photoelectrically converting means comprises a separate array of pixel elements on which a corresponding light image is formed.

30. A focus detecting apparatus adapted to be used with a taking lens, comprising:
    means for re-focusing a light image of an object obtained through said taking lens as at least three separated substantially identical secondary light images, said re-focusing means having at least three openings successively spaced non-equidistantly and forming said secondary light images from light beams passed through said openings, respectively;

at least three means for photoelectrically converting said secondary light images, respectively, and for generating output signals;

means for detecting respective relative displacements of at least two pairs of said secondary light images on the basis of the output signals of said converting means; and focus detecting means for detecting focus on the basis of said relative displacement of one of said at least two pairs of said secondary light images corresponding to a pair of said openings having a distance therebetween larger than the distance between another pair of said openings, when an amount of said detected relative displacement is smaller than a predetermined amount, and for detecting focus on the basis of said relative displacement of another of said at least two pairs of said secondary light images corresponding to said another pair of said openings, when an amount of said detected relative displacement is greater than said predetermined amount.

31. An apparatus according to claim 30, wherein said openings are all disposed away from and at the same side of an optical axis of said taking lens.

32. An apparatus according to claim 30, wherein each of said photoelectrically converting means comprises a separate array of pixel elements on which a corresponding light image is formed.

* * * * *